Patented Nov. 24, 1942

2,303,064

UNITED STATES PATENT OFFICE 2,303,064

PROCESS FOR SIMULTANEOUSLY DEPHOSPHORIZING AND DEOXIDIZING STEEL

René Perrin, Paris, France, assignor to Societe d'Electro-Chimie, d'Electro-Metallurgie et des Acieries Electriques d'Ugine, Paris, France, a corporation of France No Drawing. Application June 22, 1940, Serial No. 341,967. In France June 23, 1939

3 Claims. (Cl. 75—46)

This invention relates to a method for the simultaneous dephosphorization and deoxidization of steel.

The chief object of the invention is to provide a method for obtaining in one and the same operation steels possessing low contents of phosphorus and of oxygen, manganese being at the same time introduced into the steel. The said method is more especially applicable to the manufacture of steel in a basic converter.

It is well known that it is comparatively easy to obtain a steel with a low phosphorus content in a Thomas converter without having to take particular precautions, but this result is often obtained only at the cost of an overoxidation of the metal. Furthermore, it is well known that if manganese is introduced into the metal in such a converter at the end of the process, a considerable re-introduction of phosphorus is produced due to the reduction by the manganese of some phosphorous compound of the slag remaining in the apparatus or in the walls impregnated with $P_2O_5$. In order to do away with this drawback it is possible, as applicant has proposed in his French Patent No. 843,029 of February 5, 1938, to introduce into the apparatus simultaneously with the manganese a slag containing a proportion of MnO sufficient for preventing the said reduction of phosphoric acid or other phosphorous compounds.

The applicant has already proposed, in another connection, a method for manufacturing steels having a low phosphorus content without leading simultaneously to a prohibitive oxygen content and even while causing a certain deoxidation. This method essentially consists in treating the oxidized steel by means of a basic non-oxidizing slag, thereby using the iron oxide dissolved in the metal for oxidizing the phosphorus and causing the so formed phosphoric acid to be absorbed by the lime which is present in the slag. But this method is applicable only to highly oxidized steels and the amount of phosphorus which can be removed is limited by the quantity of the oxidizing element, i. e. the iron oxide dissolved in the metal. This quantity of dissolved iron oxide is always less than the amount which would be required to saturate the steel with iron oxide.

The method which forms the subject of the present invention has for its purpose to produce a dephosphorization of the steel irrespective of the degree of oxidation of the latter with a simultaneous introduction of manganese into the steel and a concomitant deoxidation, without it being necessary to use an addition of manganese in metallic or alloy form.

The said method consists in treating the phosphorous steel with a basic slag rich in MnO and which may contain also iron oxide as well as other elements such as fluidifying agents, by bringing into play a quantity of slag sufficient to cause the proportion of $P_2O_5$ in the final slag to be comparatively low, such as, for example, of the order of 5%, the ratio between the manganese oxide and iron oxide contents of the final slag being the higher, the higher is the intended final manganese content of the steel.

In carrying out the method according to the invention, the initial MnO content of the slag used for treating the steel will be the higher, all other things being the same, the higher is the quantity of manganese to be introduced into the metal. The quantity of slag to be used is increased as the dephosphorization to be obtained and the amount of manganese to be introduced into the steel is increased.

Practically, if it is intended to obtain a rather high final manganese content, for instance 0.3%, the ratio MnO/FeO will be taken equal to or higher than 1.

The treatment will be effected preferably by one of the known methods of violent intermixing between molten steel and slag, either by rapidly pouring the steel in thick jet from considerable height, say four to six meters, on to the slag or by a gaseous intermixing caused by an energetic blowing operation in a receptacle, or by a gaseous intermixing caused by a gaseous escape due to the reaction of purification itself which is more particularly the case when a high carbon steel is treated.

The slag which is used can be introduced into the ladle or apparatus in which the reaction is effected either in the molten state, which is generally very advantageous, or in the solid state, more particularly when the quantity of slag to be used is comparatively low with respect to the quantity of metal to be treated, or when the metal contains an excess of heat sufficient for melting the slag. In these latter cases it will be possible to introduce either a previously formed slag or the constituents of this slag in the preheated or non-preheated state.

The method according to the invention offers the above mentioned advantage of producing a dephosphorization of the steel while deoxidizing it in a very substantial manner. Furthermore, it allows a re-introduction of manganese in the metal, thus dispensing with any addition of metallic manganese. In the case where the steel is manufactured and heated according to the invention in a Thomas converter, this re-introduction of manganese can be effected without any fear of re-phosphorization. For this purpose it is sufficient, after a first normal blowing operation having lowered the phosphorus content to 0.05%, for example, to slag out the converter and to introduce the slag according to the invention (basic slag rich in MnO) in the converter as a second slag. After a very short further blowing designed for establishing the equilibrium between the metal and the slag, the phosphorus content will be lowered to the desired value and, simultaneously, the metal will have received the necessary addition of manganese owing to a reduction of the MnO of the slag: It will thus be ready for casting without any direct addition of manganese having been necessary.

In addition to the above mentioned advantages, which offer a considerable simplification more particularly in the Thomas process and especially when it is desired to obtain a high grade metal from Thomas steel, the method offers in all cases the considerable advantage of not requiring the use of metallic manganese. It permits using manganese ore instead of ferro-manganese and thus does away with the necessity of specially manufacturing this latter alloy, thereby effecting considerable saving in cost.

*Example:* A Thomas steel of the following analysis: C=0.05%; Mn=0.08%; P=0.05% and possessing an oxygen content of 0.060% has been violently intermixed with 4% by weight of a slag of the following analysis.

|  | Percent |
|---|---|
| FeO | 10 |
| MnO | 15 |
| CaO | 60 |
| SiO$_2$ | 5 | the remainder being formed of fluidifying agents and more particularly by fluor-spar.

After treatment the steel had the following analysis:

C=0.05%; Mn=0.3%; P=0.012% and showed an oxygen content of 0.030%.

The analysis of the final slag was approximately the following:

|  | Percent |
|---|---|
| FeO | 9 |
| MnO | 7.5 |
| CaO | 62 |
| SiO$_2$ | 6 |
| P$_2$O$_5$ | 2.5 |

What I claim is:

1. A method for the simultaneous dephosphorization and deoxidization of steel in a Thomas converter with concomitant introduction of manganese, which consists in effecting a normal blowing operation in order to lower the phosphorus content of the steel to a value of the order of 0.05%, in slagging off, then in introducing in the converter onto the steel a quantity of a basic slag rich in manganese oxide which is sufficient for causing the proportion of P$_2$O$_5$ in the final slag to be not over about 5% and in effecting a very short further blowing in order to establish equilibrium between metal and slag.

2. A method for the simultaneous dephosphorization and deoxidation of steel in a Thomas converter with concomitant introduction of manganese, which consists in effecting a normal blowing operation in order to lower the phosphorus content of the steel to a value of the order of 0.05%, in slagging off, then in adding to the steel a quantity of a basic slag rich in manganese oxide which is sufficient for causing the proportion of P$_2$O$_5$ in the final slag to be not over about 5% and in vigorously mixing the steel with the slag in order to establish equilibrium between steel and slag.

3. A method for the simultaneous dephosphorization and deoxidation of steel in a Thomas converter with concomitant introduction of manganese which consists in manufacturing a bath of steel the content of which in phosphorus is not over about 0.05%, in a Thomas converter, rapidly pouring the said bath without the slag formed in the converter onto a quantity of a basic slag rich in manganese oxide which is sufficient for causing the proportion of P$_2$O$_5$ in the final slag to be not over about 5% and separating the so treated steel from the slag.

RENÉ PERRIN.

CERTIFICATE OF CORRECTION.

Patent No. 2,303,064. November 24, 1942.

RENE PERRIN.

It is hereby certified that error appears in the printed specification of the above numbered patent requiring correction as follows: Page 2, second column, line 19, claim 1, after "oxide" insert --, said slag having a ratio of manganese oxide to iron oxide at least equal to 1,--; and that the said Letters Patent should be read with this correction therein that the same may conform to the record of the case in the Patent Office.

Signed and sealed this 12th day of January, A. D. 1943.

(Seal)

Henry Van Arsdale,
Acting Commissioner of Patents.